United States Patent
Loriette et al.

(10) Patent No.: US 8,289,622 B2
(45) Date of Patent: Oct. 16, 2012

(54) SYSTEM FOR THE STRUCTURED ILLUMINATION OF A SAMPLE

(75) Inventors: Vincent Loriette, Paris (FR); Benoît Dubertret, Paris (FR); Pedro Felipe Gardeazabal Rodriguez, Los Angeles, CA (US)

(73) Assignee: Centre National de la Recherche Scientifique—CNRS, Paris Cedex (FR)

( * ) Notice: Subject to any disclaimer, the term of this patent is extended or adjusted under 35 U.S.C. 154(b) by 120 days.

(21) Appl. No.: 12/738,573

(22) PCT Filed: Oct. 17, 2008

(86) PCT No.: PCT/FR2008/001469
§ 371 (c)(1),
(2), (4) Date: Dec. 20, 2010

(87) PCT Pub. No.: WO2009/090341
PCT Pub. Date: Jul. 23, 2009

(65) Prior Publication Data
US 2011/0116163 A1   May 19, 2011

(30) Foreign Application Priority Data
Oct. 18, 2007   (FR) ...................................... 07 07299

(51) Int. Cl.
*G02B 21/06*   (2006.01)
(52) U.S. Cl. ........................................ 359/385; 359/370
(58) Field of Classification Search .................. 359/370, 359/385
See application file for complete search history.

(56) References Cited

U.S. PATENT DOCUMENTS

| | | | | |
|---|---|---|---|---|
| 6,259,557 B1 * | 7/2001 | Miyashita et al. | ............ | 359/387 |
| 6,269,206 B1 * | 7/2001 | Simon et al. | .................... | 385/31 |
| 6,888,148 B2 * | 5/2005 | Wolleschensky et al. | . | 250/458.1 |
| 7,046,342 B2 * | 5/2006 | Hinsberg et al. | ................ | 355/75 |
| 7,170,696 B2 * | 1/2007 | Wolleschensky | ............ | 359/831 |
| 7,179,571 B2 * | 2/2007 | Hinsberg et al. | ................ | 430/22 |
| 7,274,446 B2 * | 9/2007 | Wolleschensky et al. | .... | 356/300 |
| 7,298,461 B2 * | 11/2007 | Cremer et al. | .................. | 356/73 |
| 7,312,432 B2 * | 12/2007 | Liang | ........................... | 250/216 |
| 7,463,344 B2 * | 12/2008 | Wolleschensky et al. | ...... | 356/72 |
| 7,480,060 B2 * | 1/2009 | Goldman | ..................... | 356/521 |
| 7,485,875 B2 * | 2/2009 | Wolleschensky et al. | . | 250/458.1 |
| 7,920,330 B2 * | 4/2011 | Aschwanden et al. | ........ | 359/665 |

(Continued)

FOREIGN PATENT DOCUMENTS

JP   2009098215 A   *   5/2009

*Primary Examiner* — Mark Consilvio
(74) *Attorney, Agent, or Firm* — Arent Fox LLP

(57) ABSTRACT

The invention relates to a structured illumination system (8) for the three-dimensional microscopy of a sample (14), that comprises: beam generation means (9, 10) adapted for generating coherent light beams ($I_N$, $I_{-N}$, $I_0$); a lens (12) having a rear focal plane (PFA), and arranged so that the sample (14) can be placed in the focalisation plane (PMP) of the lens; focalisation means (19) arranged for focusing the light beams in the rear focal plane (PFA) so that the beams interfere in a collimated manner in the focalisation plane (PMP) of the lens (12); characterised in that the beam generation means (9, 10) includes a light space modulator (10) programmed for diffracting a light signal (22) in order to generate at least two different diffracted beams (($I_N$, $I_0$), ($I_{-N}$, $I_0$)) that are not symmetrical relative to the lens optical axis, wherein the light space modulator includes a calculator adapted for applying a constant phase term to each of said at least two coherent beams.

9 Claims, 3 Drawing Sheets

U.S. PATENT DOCUMENTS

| | | | |
|---|---|---|---|
| 7,969,652 B2* | 6/2011 | Nakayama et al. | 359/370 |
| 8,019,136 B2* | 9/2011 | Lee et al. | 382/128 |
| 8,072,611 B2* | 12/2011 | De Groot | 356/511 |
| 8,081,378 B2* | 12/2011 | Osawa et al. | 359/385 |
| 8,115,806 B2* | 2/2012 | Osawa et al. | 348/63 |
| 8,115,992 B2* | 2/2012 | Brueck et al. | 359/385 |
| 8,174,761 B2* | 5/2012 | Amberger et al. | 359/368 |
| 2003/0132394 A1* | 7/2003 | Wolleschensky et al. | 250/458.1 |
| 2007/0171519 A1* | 7/2007 | Wolleschensky | 359/385 |
| 2007/0206276 A1* | 9/2007 | Gugel et al. | 359/385 |
| 2007/0272861 A1* | 11/2007 | Harada et al. | 250/311 |
| 2008/0158668 A1* | 7/2008 | Ouchi et al. | 359/385 |
| 2009/0046164 A1* | 2/2009 | Shroff et al. | 348/222.1 |
| 2009/0219607 A1* | 9/2009 | Saggau et al. | 359/305 |
| 2010/0059696 A1* | 3/2010 | Heintzmann et al. | 250/550 |
| 2010/0195112 A1* | 8/2010 | Davidson | 356/498 |
| 2010/0265575 A1* | 10/2010 | Lippert et al. | 359/385 |
| 2011/0116163 A1* | 5/2011 | Loriette et al. | 359/385 |
| 2011/0194175 A1* | 8/2011 | Dougherty et al. | 359/386 |
| 2012/0026311 A1* | 2/2012 | Ouchi et al. | 348/79 |
| 2012/0133937 A1* | 5/2012 | Heintzmann et al. | 356/364 |

* cited by examiner

SYSTEM FOR THE STRUCTURED ILLUMINATION OF A SAMPLE

CROSS-REFERENCE TO RELATED APPLICATION

This application is a National Stage entry of International Application No. PCT/FR2008/001469, filed Oct. 17, 2008, which claims priority to French Application No. 07/07299, filed Oct. 18, 2007 the entire specification claims and drawings of which are incorporated herewith by reference.

The invention relates to a structured illumination system for the three-dimensional microscopy of a sample.

The publication by Wilson et al. "Confocal Microscopy by Aperture Correlation", 1996, describes such a system of structured illumination for the three-dimensional microscopy of a sample.

In this publication, the illumination of the sample is structured by a movable grid. Such a structure enables the enhancement of the axial resolution of the system relative to a so-called conventional microscope, but it does not make it possible to enhance the lateral resolution.

The invention more particularly relates to a system for the structured illumination for the three-dimensional microscopy of a sample including:
  beam generation means adapted for generating coherent light beams;
  a lens having a rear focal plane, the lens being arranged so that the sample can be placed in the focalisation plane of the lens;
  focalisation means arranged for focusing the light beams in the rear focal plane so that the beams interfere in a collimated manner in the focalisation plane of the lens.

Such a system for the structured illumination of a sample is more particularly known from the publication by Gustaffson et al. "Extended Resolution Fluorescence Microscopy", 1999.

In this document, as illustrated in FIG. 1, the illumination system 1 includes a light source 2, a diffraction network 3 forming the beam generation means, the diffraction network 3 being coupled to a filter 7 so as to generate only two coherent diffracted light beams 4a and 4b from the light source 2, a lens 5 arranged for focusing the coherent beams 4a and 4b in the rear focal plane PFA of a lens 6 of a microscope, a sample 18 being positioned in the focalisation plane PMP of the lens 6. The coherent beams 4a and 4b are diffracted beams with symmetrical orders p and −p.

Such a system for a structured illumination for the three-dimensional microscopy of a sample has the advantage of having an enhanced lateral resolution and of enabling full field measurements.

However, the main drawback is that it has an axial resolution similar to that of a so-called conventional microscope, i.e. of the order of 0.4 micrometers.

Then, an object of the invention is to enhance the axial resolution in such a system for the structured illumination for the three-dimensional microscopy of a sample.

The application US 2007/0171519 aims at reaching this goal and describes a system for the structured illumination for the three-dimensional microscopy of a sample such as described hereabove, wherein the coherent beams are such that two among the coherent beams are non-symmetrical relative to the lens optical axis. More particularly, the application 2007/0171519 uses beams with the diffraction orders 1, 0 and −1 to enhance the axial resolution of the illumination system.

However, this document uses a simple grid to generate the diffracted beams and it does not disclose the execution of the axial displacement of the sample to carry out the axial measurements.

Now, conventionally, displacements are carried out by mechanical systems, for example piezo-electric systems, which cause important losses of accuracy which reduce the resolution of the system.

One object of the invention is to provide a system for the structured illumination for the three-dimensional microscopy of a sample making it possible to enhance the axial resolution relative to a conventional illumination system.

The original approach on which the invention is based consists in simulating the axial displacement of the sample without any mechanical displacement.

Another object of the invention is to supply a system for the structured illumination for the three-dimensional microscopy of a sample making it possible to enhance both the axial resolution and the lateral resolution relative to a conventional illumination system, which means reaching axial resolutions of the order of 0.3 micrometers, and lateral resolutions of the order of 0.1 micrometers.

Another object of the invention is to make it possible to reach such performances while preserving an acquisition rate compatible with the study of dynamic phenomena, i.e. higher than or equal to 1 Hertz.

At least one of these goals is reached thanks to a system for the structured illumination for the three-dimensional microscopy such as described hereabove, wherein the beams generation means includes a light space modulator programmed for diffracting a light signal in order to generate at least two different coherent diffracted beams non-symmetrical relative to the lens optical axis, with the light space modulator including a calculator adapted for applying a constant phase term to each of said at least two coherent beams non-symmetrical relative to the optical axis.

Thanks to the invention and more particularly thanks to the fact that the coherent means generated by the generation means include at least two beams non-symmetrical relative to the optical axis of the lens, the sample is lit by beams which are coherent but not symmetrical in the axial direction. Then, it is possible, through a modification in the distance between the lens and the sample or to the axial displacement of the illumination in the sample, to use this lack of symmetry, more particularly from the difference in the illumination between two axial positions of the sample. Then, this makes it possible to enhance the axial resolution with respect to Gustaffson et al.'s system mentioned above and more particularly to obtain an axial resolution of less than 0.3 micrometers. According to the invention, this axial displacement is simulated using a light space modulator through the application of a phase term to each of the coherent beams. Then the measurement requires no mechanical displacement and the mechanical losses are thus reduced.

The two beams which are not symmetrical relative to the optical of the lens are more particularly diffracted beams with a diffraction order n and p, with n+p being different from 0.

In addition, thanks to the invention, the lateral resolution is kept about 0.1 micrometers like in Gustaffson et al.'s system mentioned above.

Then, as the system according to the invention is a full field imaging system, a rate of more than 1 Hz can be obtained.

According to the invention, a three-dimensional structure of the illumination has thus been obtained, which makes it possible to perform an axial encoding of the illumination in addition to the lateral encoding known per se.

The advantageous embodiments of the invention will now be described.

According to one embodiment of the invention, the beams generation means may include a light source adapted for generating a light signal.

Preferably, the beams generation means can be so arranged as to generate three coherent beams, at least two coherent beams among the three coherent beams being not symmetrical relative to the lens optical axis. Within the scope of the invention, the generation of such three coherent beams makes it possible to obtain a structured field which is symmetrical relative to the lens optical axis and a factor two gain as regards the axial resolution relative to some lighting with only two non-symmetrical coherent beams.

Preferably, the beams generation means are so arranged that the three coherent beams generated by diffraction correspond to two diffracted beams with symmetrical diffraction orders and one beam with a diffraction order equal to zero. In this case, the beams with a symmetrical order N and –N form, together with the beam with a diffraction order equal to zero, two couples of beams non-symmetrical relative to the optical axis which can be used within the scope of the invention.

More particularly, the two diffracted beams with a symmetrical diffraction order can have the same intensity and the two symmetrical diffraction orders can be so selected that the intensity of the beam with the diffraction order equal to zero is equal to four times the intensity of one of the diffracted beams with symmetrical diffraction orders. Then, it is demonstrated that the enhancement of the axial resolution is better in this case.

In order to enable lateral measurement in the xOy plane perpendicular to the optical axis z of the lens, the calculator can be programmed so as to shift phase one of said at least two of the coherent beams non-symmetrical relative to the other one. This embodiment has the advantage of enabling a lateral displacement of the interfering pattern in the sample and thus of simulating the lateral displacement of a diffracting grating through the programmation of the light space modulator. It thus makes it possible to carry out the lateral measurements without any physical displacement of the system components.

Now, one embodiment of the invention will be described while referring to the appended figures, wherein.

In the figures, identical references refer, unless otherwise mentioned, to similar technical characteristics.

Figure 2:
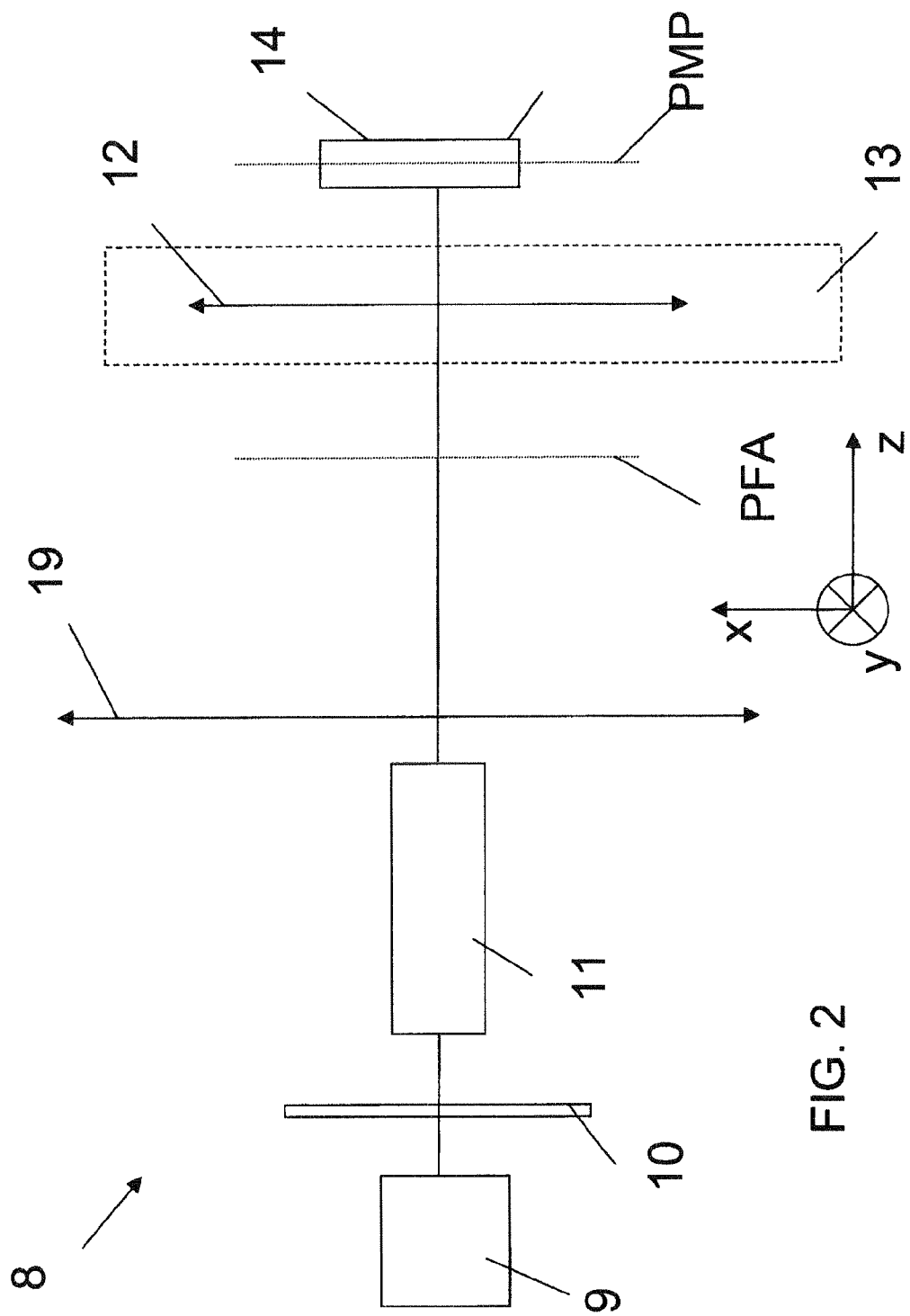
FIG. 2 shows a system for the structured illumination for the three-dimensional microscopy of a sample according to one embodiment of the invention.

As illustrated in FIG. 2, according to a first embodiment of the invention, a system 8 for the structured illumination for the three-dimensional microscopy of a sample includes a light source 9 adapted for generating a coherent and linearly polarised light signal. The light source 9 is for example a laser beam. It also includes a transmission or reflection light space modulator 10 programmed for generating, from the light signal received from the source 9, three diffracted beams with three respective intensities $I_N$, $I_{-N}$ and $I_0$. The diffracted beams $I_N$ and $I_{-N}$ are beams with symmetrical orders N and the beam $I_0$ corresponds to a beam with an order equal to zero.

The beams $I_0$ and $I_N$ are not symmetrical relative to the lens optical axis. Similarly, the beams $I_0$ and $I_{-N}$ are non-symmetrical relative to the lens optical axis.

The order N of the diffracted beams $I_N$ and $I_{31\ N}$ is so selected that the intensity of the beam with the order equal to zero is equal to four times the intensity of such beams, i.e. $I_0=4I_N+4I_{-N}$. It is thus demonstrated that the enhancement of the axial resolution is better in this case.

To have the light signal received from the source 9 adapt to the size of the light space modulator 10, it is possible to position an afocal device which is not shown between the source 9 and the light space modulator 10 so as to widen the light signal, for example by five to ten times.

At the outlet of the light space modulator 10, the diffracted beams go through a new afocal device 11 and are focused in the rear focal plane PFA of a lens 12 of a microscope 13 by an achromatic lens 19. The magnification factor of the afocal device 11 is so selected that the diffraction angles are adapted to the diameter of the lens 12 of the microscope 13.

A sample 14 for example in the form of a fluorescent punctual object is placed in the focalisation plane PMP of the lens 12 of the microscope 13 where the three diffracted beams $I_N$, $I_{-N}$ and $I_0$ interfere.

The system 8 described above enables a three-dimensional structure of the illumination towards the sample 14. As a matter of fact, using three diffraction orders shows a Talbot effect in the field transmitted by the lens.

In operation, to carry out measurements in the lateral plane xOy, the light space modulator 10 is programmed so as to laterally displace the interference pattern generated by the three diffracted beams in the lens focalisation plane. Such focalisation makes it possible to simulate the lateral displacement of the diffraction network generating the three diffracted beams without the modulator being physically displaced. Further to this simulated lateral displacement, the position of the fluorescent punctual object is measured in a way known per se by combining several images or the Fourier transformation thereof for various real or simulated positions of the diffraction network, for example through the difference between the intensity of the received fluorescence for two real or simulated positions of the diffraction network.

In addition, in operation, to carry out measurements according to the axial direction z, the optical distance between the sample 14 and the lens 12 is modified. For this purpose, a piezo-electric plate 15 positioned close to the sample 14 can be used or the lens 12 can be displaced axially. According to the invention, it is also possible to simulate this displacement by programming the light space modulator 10 to apply a constant phase term to all the pixels in the modulator 10, which consequently applies a constant phase term to the diffracted beams.

As mentioned above and thanks to the well-known Talbot effect, the axial position of the fluorescent punctual object is measured, for example though the difference between the intensity of the received fluorescence for two real or simulated distances between the lens 12 and the sample 14.

Figure 3:
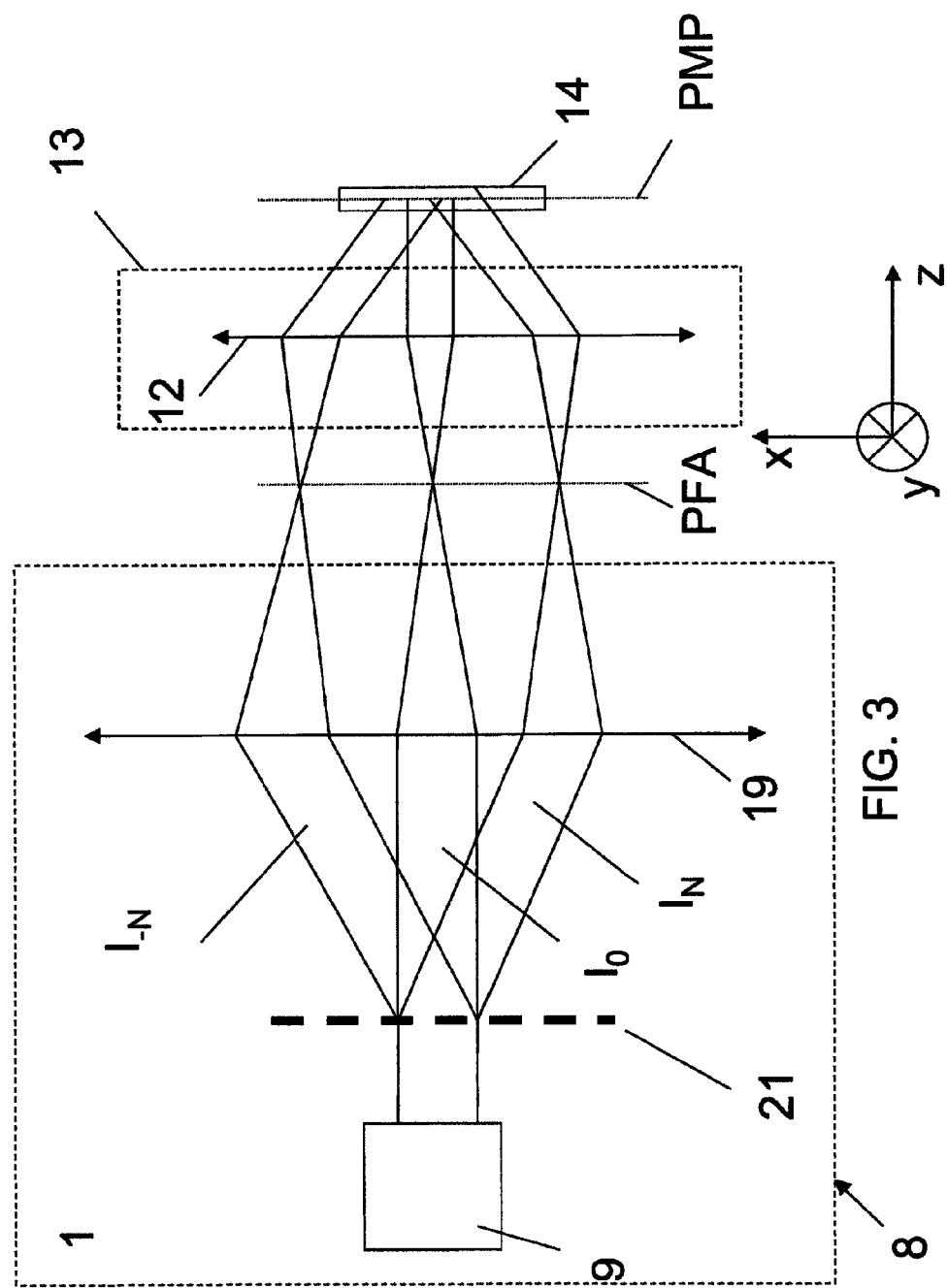
FIG. 3 shows the paths of the light beams in a system such as illustrated, while referring to FIG. 2.

In FIG. 3, the path of the light beams is illustrated thanks to the illumination system according to the invention. According to the invention, the light source 9 generates a light signal in the form of a plane wave 22. This plane wave is diffracted by beams generation means 21 making it possible to generate only three diffraction orders $I_0$, $I_N$ and $I_{-N}$. Such beams generation means correspond to the light space modulator 10 described while referring to FIG. 2. The diffracted beams $I_0$, $I_N$ and $I_{-N}$, are plane waves. The focalisation means 19 which correspond, for example, to a lens or to an achromatic lens 19 described hereabove, make such beams converge towards the rear focal plane PFA of the lens 12 of the microscope 13. Thus, the beams $I_0$, $I_N$ and $I_{-N}$ interfere in the focalisation plane PMP in the form of plane waves and the measurements relating to a sample 14 positioned in the focalisation plane PMP can be performed.

Alternative solutions of the invention will now be described.

Beams generation means have been described hereabove which make it possible to generate three coherent beams which interfere at the focalisation plane of the lens. The effect of enhancing the axial resolution is then optimal for the beams $I_N$, $I_{-N}$ and $I_0$, with the order N and -N being selected as above-mentioned so that $I_0=4I_N=4I_{-N}$.

However, it should be understood that the enhancing effect of the axial resolution is obtained as soon as the diffracted beams are such that at least two coherent beams non-symmetrical relative to the optical axis of the lens interfere at the focalisation plane PMP of the lens 12. As a matter of fact, in this case, the axial symmetry of the beams is broken and it is possible to obtain information on the axial position of the sample 14 by displacing the sample 14 with respect to the lens 12 or by simulating such displacement as mentioned above.

Figure 1:
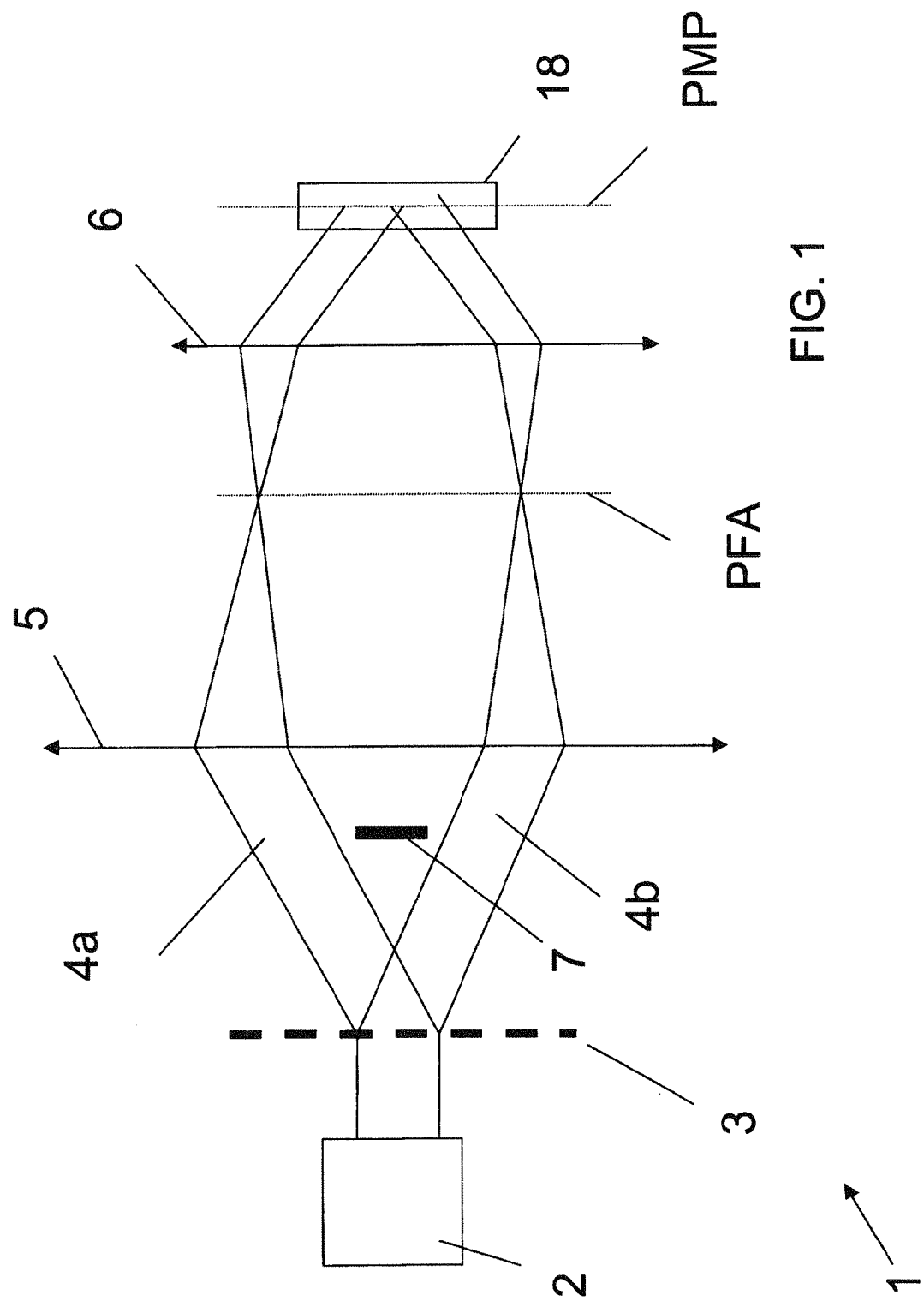

On the contrary, it should be noted, while referring to FIG. 1, that one displacement of the sample 18 with respect to the lens 6 will have no effect within the scope of the system 1 described in Gustaffson et al.'s publication, since the two beams 4a and 4b are symmetrical relative to the lens optical axis. Such an axial displacement thus does not make it possible to perform precise axial measurements.

It has been demonstrated that the above-mentioned invention made it possible to enhance the axial resolution of a factor of the order of 10 with respect to the focal conventional microscopy.

In addition, the utilisation of a light space modulator as described while referring to FIG. 2 has the advantage of avoiding the mechanical displacements of the system and thus of enhancing the accuracy of measurements.

The system 8 described above can also easily be adapted on an existing microscope 13 together with the existing illumination system.

In this case, in the above-mentioned embodiments, the microscope 13 may be an existing microscope with an existing lens 12, and the illumination system is adapted so that the beams $I_N$, $I_{-N}$ and $I_0$ are focused in the rear focal plane PFA of the lens 12. Then, a new microscope is obtained which has an enhanced resolution enabling a full field observation.

The invention claimed is:

1. A structured illumination system (8) for the three-dimensional microscopy of a sample (14) comprising:
a beam generation device (9, 10) capable of generating at least one coherent light beam ($I_N$, $I_{-N}$, $I_O$);
an objective lens (12) having a rear focal plane (PFA), a front focal plane and an optical axis, the lens being arranged so that the sample (14) can be placed in the front focal plane (PMP) of the objective lens;
a focusing lens (19) arranged for focusing the coherent light beam at the rear focal plane (PFA) so that the coherent light beam interferes in a collimated manner at the front focal plane (PMP) of the objective lens (12);
wherein the beam generation device (9, 10) includes a spatial light modulator (10) programmed to diffract the coherent light beam (22) in order to generate at least two different diffracted beams ($I_N$, $I_O$), ($I_{-N}$, $I_O$) that are not symmetrical relative to the optical axis of the objective lens;
wherein the spatial light modulator includes a calculator capable of applying a constant phase to each of said at least two diffracted beams.

2. A system according to claim 1, wherein the beams generation device includes a light source (9) adapted for generating the coherent light beam (22).

3. A system according to claim 2, wherein said at least two non-symmetrical coherent beams are diffracted beams with a respective diffraction order n and p, with n +p being different from zero.

4. A system according to claim 1, wherein said at least two non-symmetrical diffracted beams are diffracted beams with a respective diffraction order n and p, with n+p being different from zero.

5. A system according to claim 1, wherein the beams generation device (10, 9) is capable of generating three coherent beams ($I_N$, $I_{-N}$, $I_O$), at least two coherent beams ($I_N$, $I_{-N}$, $I_O$) among the three coherent beams being non-symmetrical relative to the optical axis of the objective lens.

6. A system according to claim 5, wherein the beams generation device (10, 9) is adapted so that the three coherent beams generated by diffraction correspond to two diffracted beams with symmetrical diffraction orders and a beam with a diffraction order equal to zero.

7. A system according to claim 6, wherein the two diffracted beams with symmetrical diffraction orders have an equal intensity and the two symmetrical diffraction orders are selected so that the intensity of the beam with a diffraction order equal to zero is equal to four times the intensity of one of the diffracted beams having a symmetrical diffraction order.

8. A system according to claim 1, wherein the calculator is further capable of shifting the phase of one of the two non-symmetrical coherent beams with respect to the other one.

9. A microscope including a structured illumination system (8) according to one of claims 1 to 8.

* * * * *